UNITED STATES PATENT OFFICE.

HENRY MARIE FERDINAND JULES COMTE DE LA TOUR DU BREUIL AND ALEXANDRE MARIE AUGUSTE VICOMTE DE LA TOUR DU BREUIL, OF PELLEVOISIN, FRANCE.

PROCESS OF VULCANIZING INDIA-RUBBER.

SPECIFICATION forming part of Letters Patent No. 266,110, dated October 17, 1882.

Application filed June 20, 1882. (No specimens.) Patented in France March 21, 1882, No. 148,010.

*To all whom it may concern:*

Be it known that we, HENRY MARIE FERDINAND JULES COMTE DE LA TOUR DU BREUIL and ALEXANDRE MARIE AUGUSTE VICOMTE DE LA TOUR DU BREUIL, both of Pellevoisin, (Indre,) in the Republic of France, have invented a new Process for Vulcanizing India-Rubber, (for which French Letters Patent were issued, dated March 21, 1882, No. 148,010,) of which the following is a specification.

This invention relates to vulcanizing or combining sulphur with india-rubber; and it consists in improved means for obtaining the proper temperature for effecting the combination or vulcanization, as hereinafter described.

The vulcanization of india-rubber—that is to say, the combination of a certain proportion of sulphur with india-rubber—has heretofore been effected by means of various different processes. According to one of these processes, for example, the india-rubber articles are immersed in a bath of liquid sulphur at a temperature of 120° centigrade. Another process consists in employing air heated to such a temperature as to effect the combination of the sulphur and india-rubber, the former being previously incorporated with the india-rubber when in the condition of flowers of sulphur. According to a third process steam is employed under a pressure of four and a half atmospheres in order to obtain a temperature of about 140° in order to produce the desired combination, while a fourth process consists in employing sulphuret of carbon containing chloride of sulphur in solution. These processes are either attended with certain disadvantages or necessitate the employment of complicated apparatus, and in the case of the treatment with hot air and steam it is found difficult to properly regulate or control the temperature.

By means of this invention the difficulties which have hitherto attended the vulcanization of india-rubber are obviated.

The improved process for effecting the vulcanization of india-rubber according to this invention consists in employing at atmospheric pressure a bath composed of water and an inert soluble salt which possesses the property of retarding the ebullition of the water, and thus enables the temperature of the latter to be raised to from 140° to 150° centigrade, or to a point at which the sulphur and the india-rubber combine.

In carrying out this invention the most economical salt to employ for the aforesaid purpose is chloride of calcium; but it is evident that a solution of any salt possessing similar properties—such as carbonate of potash, acetate of soda, nitrate of potash, and the like— or liquids—such as glycerine or heavy oils, for example—may also be employed, provided that the boiling-point of the solution or liquid at atmospheric pressure is higher than the melting-point of sulphur, and fitted to effect the combination of the latter with india-rubber.

The apparatus employed in order to carry out the improved process is of the simplest description, and consists of one or more vessels of wrought or cast iron, brass, or other metal of any suitable form and dimensions, according to the number, shape, and size of the articles or objects to be vulcanized. These vessels are filled with a solution or liquid capable of being heated to a suitable temperature for effecting the vulcanization, as hereinbefore described, and are placed over a furnace so arranged as to utilize to the best advantage either the waste heat of another furnace or the heat generated in a special combustion-chamber, the heated gases being caused to circulate underneath the vessel in the first place, for example, and returning to the chimney by lateral flues. A suitable quantity of sulphur being introduced into the bath, the articles to be vulcanized, either in molds or wrapped in cloths in the usual manner, are immersed in the bath, and become vulcanized by the action of the sulphur contained therein. When one series of articles has been thus vulcanized and removed another series may be introduced into the same bath and the operations repeated without interruption.

We claim—

1. In vulcanizing india-rubber by means of a water bath, the process herein described of raising the boiling-point of the water by adding thereto a soluble salt or other substance incapable of acting on the india-rubber, for the purpose of enabling the temperature of the bath to be raised to from about 140° to 150° centigrade under atmospheric pressure—that is to say, to a degree of heat higher than the melting-point of sulphur and suitable for effecting the vulcanization, substantially as hereinbefore described.

2. The improved process of vulcanizing india-rubber, consisting essentially in melting the sulphur in a bath composed of water and a substance which raises the boiling-point of the water to the required degree, and immersing the articles to be vulcanized in this bath, substantially as hereinbefore described.

In testimony whereof we have signed our names to this specification in the presence of two subscribing witnesses.

HENRY MARIE FERDINAND JULES
COMTE DE LA TOUR DU BREUIL.
ALEXANDRE MARIE AUGUSTE
VICOMTE DE LA TOUR DU BREUIL.

Witnesses:
JOSEPH DELAGE,
E. P. MACLEAN.